United States Patent [19]

Anderson

[11] 4,267,004

[45] May 12, 1981

[54] LABEL POSITION SENSOR FOR LABELLER

[75] Inventor: Dale L. Anderson, Mound, Minn.

[73] Assignee: Datafile Limited, Willowdale, Canada

[21] Appl. No.: 17,966

[22] Filed: Mar. 8, 1979

[51] Int. Cl.[3] ...................... B32B 1/00

[52] U.S. Cl. ...................... 156/361; 156/542; 156/584

[58] Field of Search ...................... 156/361-364, 156/540-542, 584, 350-351

[56] References Cited

U.S. PATENT DOCUMENTS

| | | | |
|---|---|---|---|
| 3,566,083 | 2/1971 | McMillian | 250/227 X |
| 3,721,601 | 3/1973 | Dituch et al. | 156/361 X |
| 3,801,408 | 4/1974 | Kuring et al. | 156/584 X |
| 3,928,115 | 12/1975 | Kerwin | 156/363 |
| 4,048,494 | 9/1977 | Liesting | 156/DIG. 45 |

*Primary Examiner*—David A. Simmons

[57] ABSTRACT

In labelling apparatus for precision application of labels to continuously conveyed articles, labels are applied which have a pressure-sensitive adhesive backing releasably carried by a web. To provide precision in application, the leading portion of the label next to be applied is sensed and is separated from the web. A control device, on receiving a sensed label signal, determines the extent to which the leading portion of separated label extends from the web preparatory to article application. The control device resumes web movement to marry label speed with conveyed article speed in applying label to desired article location.

12 Claims, 7 Drawing Figures

LABEL POSITION SENSOR FOR LABELLER

FIELD OF THE INVENTION

This invention relates to labelling apparatus which labels continuously conveyed articles, such labels having pressure-sensitive adhesive backing and being releasably carried on a web.

BACKGROUND OF THE INVENTION

There is widespread use of automatic labelling devices for applying self-adhesive labels of the pressure-sensitive type on a great variety of articles. The labels may be preprinted or printed just prior to application of labels to articles. The self-adhesive pressure-sensitive type of label is usually provided in supply form by locating the labels in a spaced-apart manner on a backing or carrier web. The web is pretreated to ensure ease of separation from the backing paper. Such treatment may include the use of silicone to permit smooth separation of the label from the backing. To provide the supply of labels for the labelling device, such labels as they adhere to the backing are in the form of a roll which may be placed on a supply reel.

An example of an automatic labelling device using such supply of labels is that manufactured by Accraply Systems, a division of Elcono Corporation of Minneapolis, Minn., and sold under the trademark ACCRAPLY. That device applies self-adhesive labels to articles as they are conveyed past the labeller. In that instance, the label is dispensed by passing the carrier web with labels along a ramp sloped relative to the surface to which a label will be applied and pulling the carrier web around the free end of the ramp or splitter tongue to separate the label from the web. This separation is due to the label being stiffer than the carrier web in combination with the release agents on the carrier web. The separated label is then applied to an article.

A system has been developed to apply labels to file folders, where a plurality of automatic labellers apply labels at predetermined locations on a file. The system is described in co-pending United States patent application Ser. No. 830,118 and Canadian patent application Ser. No. 291,224.

In instances where it is important to ensure precision in applying labels with those devices, the labels must be all of the same length and consistently spaced-apart from each other on the supply roll web. The splicing of the supply of labels also becomes a problem for precision application because the splice must be such to ensure consistent label spacing on web. In making the splice, the label must be precisely positioned over the splice. The adhesive material on the backing web, which holds the splice together, cannot be exposed on the side of web carrying the labels to thereby ensure ease in removal of the label overlying the splice from the backing web on label transfer.

The common approach to sensing the position of the labels on the carrier prior to application is to use a sensing device which senses the position of a label several labels back of the label next to be placed or about to be applied to an article. Based on the assumption that all labels are equally spaced-apart on the backing paper and that there are no missing labels, this creates no problems. In ensuring this equal spacing, the manner of producing the labels becomes very costly, or in the alternative, when equal spacing is not assured, then the precision with which the labels are applied to articles is lost.

It becomes apparent that it would be desirable to determine the position of the label which is about to be applied so that missing labels, inconsistent spacing between labels on the web, or varying lengths of labels would create no problem in the labelling operation. Approaches have been made in the past to sense label position in this manner, such as that disclosed in U. S. Pat. No. 3,801,408. However, in that system the article to be labelled is stationary and the label is applied in a direction transverse to the direction of travel of the article after it is labelled. In that arrangement, the labelling operation functions on the basis that the labeller is actuated to cause the web to move around a device for peeling label from web. During movement of web, the label is sensed and in the same operation the peeled label is picked up by a label transfer pad and applied to the stationary article. With that type of arrangement, it is impossible to obtain precision in applying labels to continuously conveyed articles.

It is, therefore, an object of this invention to provide a labelling system for labelling articles which are conveyed by, past or under the labeller where precision of labelling is achieved regardless, for example, of spacing between and varying lengths of labels on the carrier web. Such system readily accommodates splices in the supply of labels to facilitate operation of the labellers.

SUMMARY OF THE INVENTION

The labelling apparatus according to this invention for applying labels to continuously conveyed articles uses a supply of labels having pressure-sensitive adhesive backing and releasably carried on a web. Label separation means is provided for separating a label from the web by commencing separation of label leading edge from the web. The label separation means is located proximate an article to be labelled when conveyed thereby. Label application means contacts the pressure-sensitive adhesive side of a separated label leading edge with a conveyed article. Web handling means feeds such supply of labels to and takes such web away from the label separation means. A label sensor or detector is positioned to sense the label which is about to be separated from the web. Control means controls the web handler to determine web movement. The label sensor signals the controller on sensing a label leading edge to enable the controller to determine web movement and separate at least the leading label edge from the web and continue the web movement such that the separated label portion is in a position preparatory or ready for article application. On receiving a signal to label, the controller resumes or returns the web movement to a speed such that the label and article speed correspond as the label is about to contact a desired location on such article.

The sensing of the leading edge of the label which is about to be separated from the web brings about the advantages of the invention, among which the need to ensure equal spacing between labels on backing paper and equal length of labels is avoided and to readily accommodate variation in labelling requirements respecting article size, conveyed article speeds, label characteristics in terms of strength, width and length and the like. The control means may control the feed in a manner to continue feed of labels on receiving command to apply two or more adjacent labels onto the same article, or to apply a label to each article which passes by the labeller at a speed equal to the rate at which labels can be separated from and applied to the article by the labeller.

By sensing the position of the leading edge of the label to be separated from the web, it is now possible to continue movement of the label to any desired position preparatory to label application, or to continue the web movement for serial application of labels to the same article or rapidly moving individual articles. The delay in stopping the movement of the web to determine the extent of label overhang, or the extent of label separation from the web, may be determined to precisely locate the leading edge of the label at any desired position for ready application to moving articles in a consistent manner. Such an arrangement, therefore, ensures the precise application of one or more labels to moving articles.

DESCRIPTION OF THE DRAWINGS

Preferred embodiments of the invention are shown in the drawings wherein.

DETAILED DESCRIPTION OF THE PREFERRED EMBODIMENTS OF THE INVENTION

The labelling apparatus may be used to apply self-adhesive labels to various styles, types and kinds of articles. As can be appreciated, such labels are applied to a host of articles, among which there are containers such as the glass and plastic bottle type, filing systems, consumer goods such as packaged food products, mailing devices, etc. In many instances, precision in label application is of not that much significance; however, the speed at which articles may be labelled is regularly increasing, so that provision has to be made for attaining a degree of accurate label location at higher labelling speeds. In labelling at speeds, such as 500 to 800 articles per minute, it is important to avoid misplacement of labels, or in instances of missing labels, without detection particularly in industries which require careful control on labelled products, such as the pharmaceutical industry, unlabelled articles can result in harzadous consequences to the end user or distributor. According to the system of this invention, the sensing of the leading edge of the label to be readied for application to an article overcomes problems such as missing labels on the supply web and enables control of web movement in a manner which accomplishes precision labelling.

Figure 1:
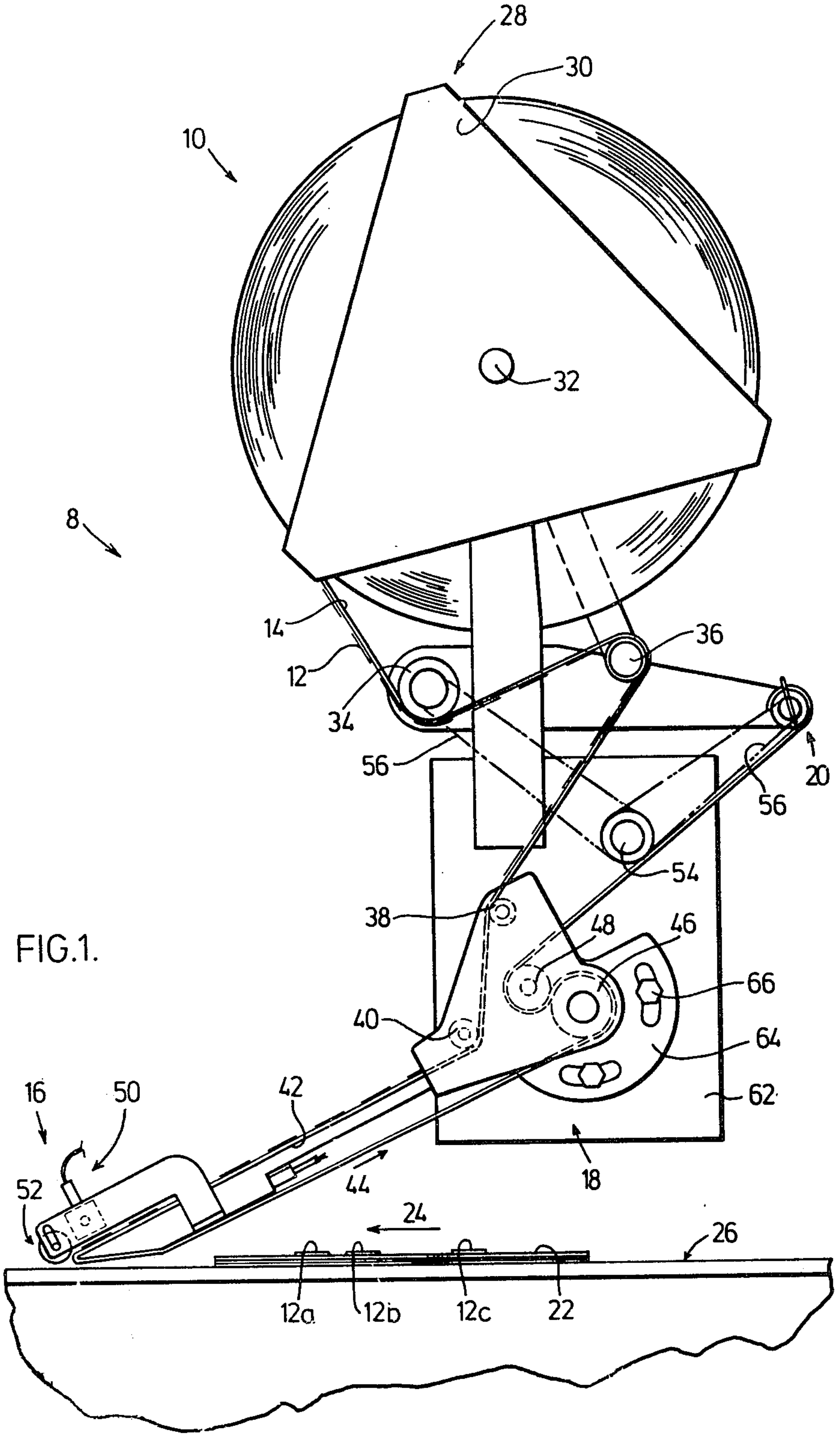
FIG. 1 is an elevation of a labeller incorporating a preferred embodiment of the invention.

A preferred embodiment of a labeller 8, as shown in FIG. 1, is used to apply labels taken from a supply roll 10. In this particular embodiment, the supply of labels is in the form of individual labels 12 spaced-apart on a backing 14. They are handled by a web handling device which feeds the labels and web downwardly to the area of the apparatus generally designated 16 which serves to separate label from web and to apply the separated label to a conveyed article. The web is removed from this area by the web handling means which may include a web drive generally designated 18 and the discarded web spooled on return spooler 20. The article to be labelled is, in this instance, a file folder 22 which is continuously conveyed in the direction of arrow 24 along conveyor bed 26. The file folder 22, is although not shown, secured to a device which moves the file holder 24 along the conveyor bed at a speed which can be determined or detected so that the labeller 8 properly applies a label to the folder. As shown, the folder 22 has already had applied thereon labels 12*a*, 12*b*, and 12*c*.

According to this particular embodiment, the rolled supply of labels 10 are mounted on a reel device 28 which has side plates 20 to confine the roll. The roll is mounted on a support core which is freely rotatable about spindle 32. A length of web and labels is withdrawn from the roll 10, passed under a continuously driven roller 34, upwardly over a spring loaded dancer arm 36, and then downwardly between rollers 38 and 40 to position the length of web on the upper surface of a ramp 42 which supports the device 16 for separating labels from the web and applying them in this instance to a folder.

The web is trained around the extremity of the ramp 42 and in reverse direction of arrow 44 through the web drive arrangement 18 which includes press rollers 46 and 48, the web 14 being fed through the nip of the counter-rotating rollers to positively grip the web and positively move it down along the ramp 42.

The web, as it passes around the extremity of the ramp 42, causes a sharp divergence in web travel thereby separating label from web. This is due to the difference in stiffness between label and web. The label is somewhat less resilient and, therefore, separates from the web as the web changes direction of travel to the extent shown. The leading separated label portion is then positioned for subsequent article application. The instantaneous position of the label about to be or next to be separated from the web is sensed by a label sensor generally designated 50 and when appropriate, the separated label is applied to the article, such as folder 22, by a label application device generally designated 52.

The label, as applied to the conveyed article, is moving or travelling in the same direction as and at the same speed as the article, so that there is no relative velocity between the articles which could induce tearing of the label or crimping of the label as it is applied to the article. To achieve essentially zero relative speed, a controller in accordance with detected file folder speed ensures that the web drive operates at a speed such that the label is travelling at the appropriate speed when it contacts the folder as applied by the label applicator 92. The controller may be a programmable computer which, based on its input including detected folder speed, ensures that the web drive is at the appropriate speed when it is expected to contact label with folder.

The web handling device, therefore, is designed to feed or pass the web to the label separation and application device and take away the web. A drive spindle 54 continuously drives, by way of belt 56, the roller 34 which in combination with dancer arm 36 ensures a constant supply of labels from the roll supply 10 to the labeller. The driven spindle 54 also by belt 56 drives the web spooler 20 to ensure take-up of any excess web after having passed through the web drive rollers 46 and 48.

Figure 2:
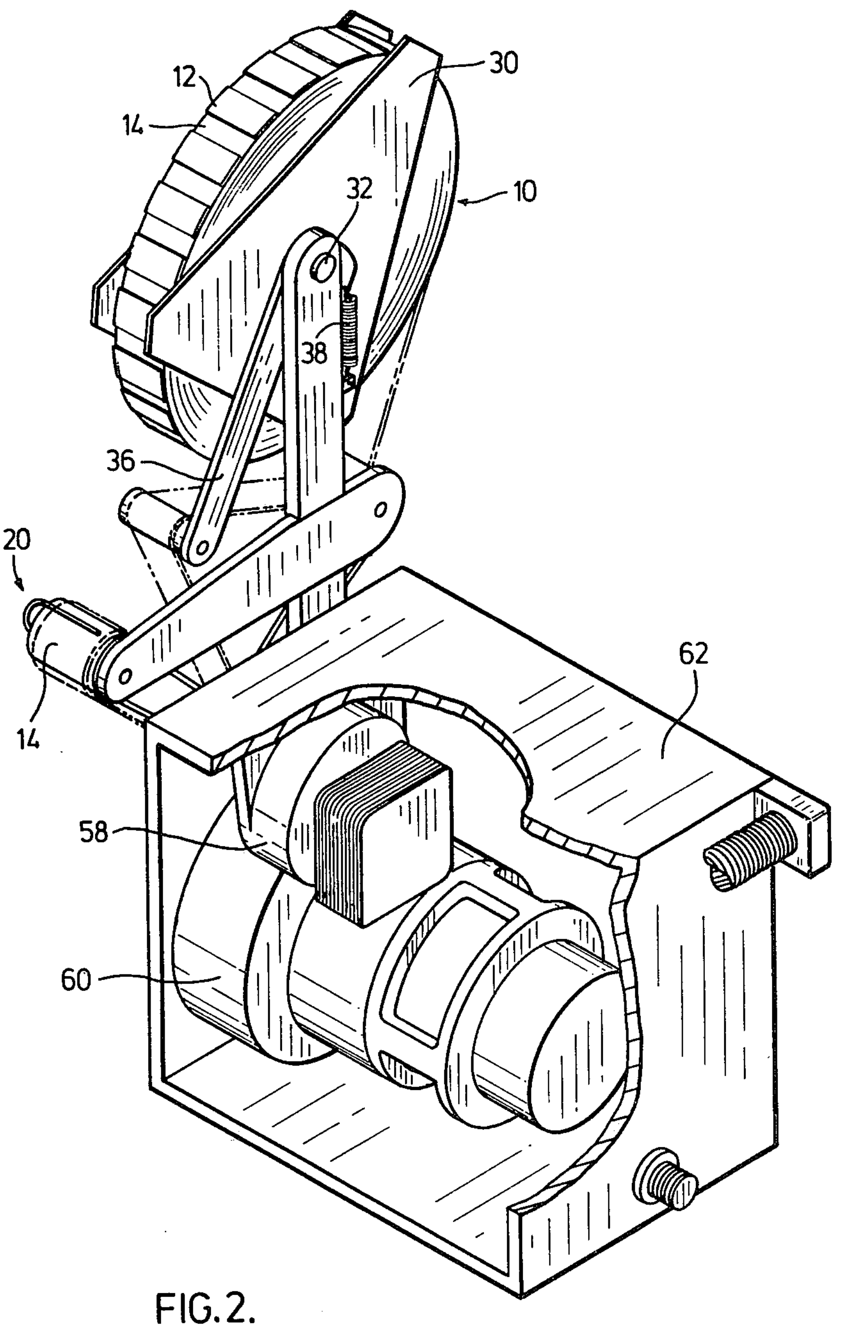
FIG. 2 is a rear perspective view of the labeller of FIG. 1.

Turning to FIG. 2, the relationship of rear plate 30, as mounted on spindle 32, is shown. The dancer arm 36 is spring loaded by spring 38. The drive mechanisms for the labeller are shown schematically by cylindrically-shaped motor 58 which drives spindle 54 and cylindrically-shaped motor 60 which powers roller 46 which may be knurled and in pressure contact with nip roller 48.

The labeller 8 has its drive mechanism 58, 60 encased in enclosure 62, which may be mounted on a support frame to locate the ramp 42 over the conveyor bed 26 and extend in the direction of travel of articles to be labelled. To achieve adjustment of the ramp end to the proper height, such as for labelling file folders, as shown in FIG. 1, the base plate 64 is rotatable about the axis of drive roller 46 and is secured to the ramp where locking bolts 66, when loosened, permit rotating of the ramp about the axis of roller 46 to properly position its height relative to the conveyor bed 26 and, when tightened, maintain that position.

Figure 3:
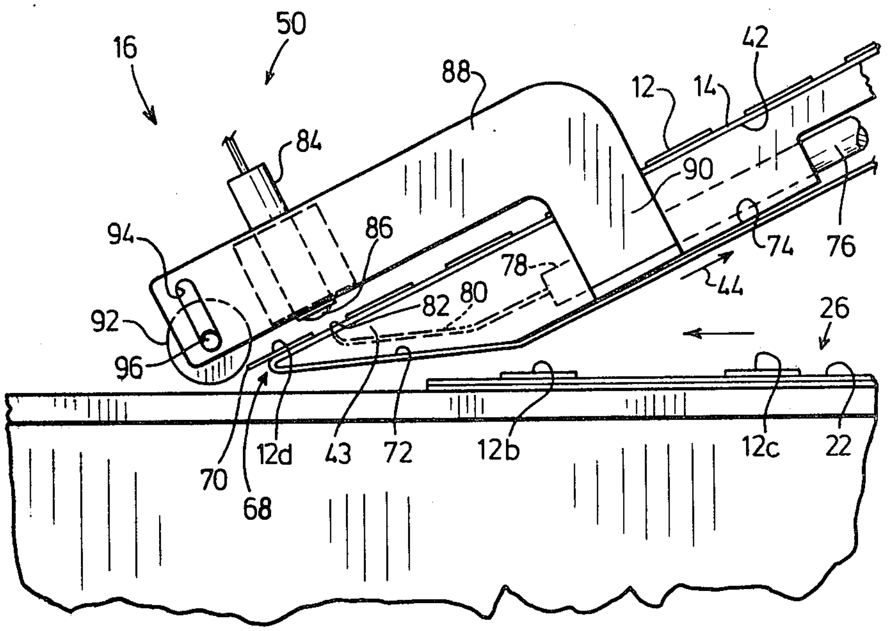
FIG. 3 is an enlargement of the component of the labeller which separates labels from the carrier web and applies them to conveyed articles.

Turning to FIG. 3, further details of the ramp 42 are shown where the label carrier web 14 moves downwardly along the ramp. The web is trained over the wedge-shaped extremity 43 of the ramp and returned downwardly in the direction of arrow 44 to provide in area 68 a sharp divergence in direction of web travel. As shown in FIG. 3, this change in direction of travel of the web results in separating, peeling or relieving the leading edge 70 of label 12*d* from the web to provide a forwardly extending portion. The label is, therefore, ready to be applied to article being conveyed towards the labelling area 16. As shown, the article is a folder 22 which has labels 12*b* and 12*c* in position, a space between which is provided to receive the label 12*d* to be applied.

In this particular embodiment, the extremity of the ramp portion 43, therefore, includes an underside 72 which is, or which approximates, the lie of the conveyor bed 26 and then has a wall 74 which defines the side of the ramp opposing its upper surface. Mounted within this wedge-shaped body portion 43 is a component of the label sensing device 50. In this particular embodiment, the label sensing device is made up of a light emitter and light receiver where the arrangement is such to detect variations in light level. A low level of light is detected for label and web interposed between emitter and receiver and a higher level of light when only web, as defined between spaced-apart labels, interposes emitter and receiver. For this particular arrangement, the light receiver 76 for the sensor is positioned within the wedge-shaped portion 43 and is shown in dot having a forward portion 78. A fibre optic bundle 80 is used to transmit light received from a slit 82 in the ramp to the light receiver 78. The light from the light emitting component 84 is beamed downwardly onto the slit 82 through lense 86 to ensure a sufficient level of light energy transmitted to receiving end of fibre optic bundle 80. A stationary location of the label sensor 50 relative to the ramp surface 42 is provided where the light emitter 84 may be secured to the arm 88 which, in turn, is secured at its depending portion 90 to the ramp 42.

At the outer extremity of arm 82, a roller device 92 is mounted by axial pin in elongate slots 94 of opposing pairs of arms 88. The roller is urged downwardly by spring members not shown. The purpose of the roller is to contact labels with file folders in the manner to be discussed with respect to FIGS. 5 and 6.

Figure 7:
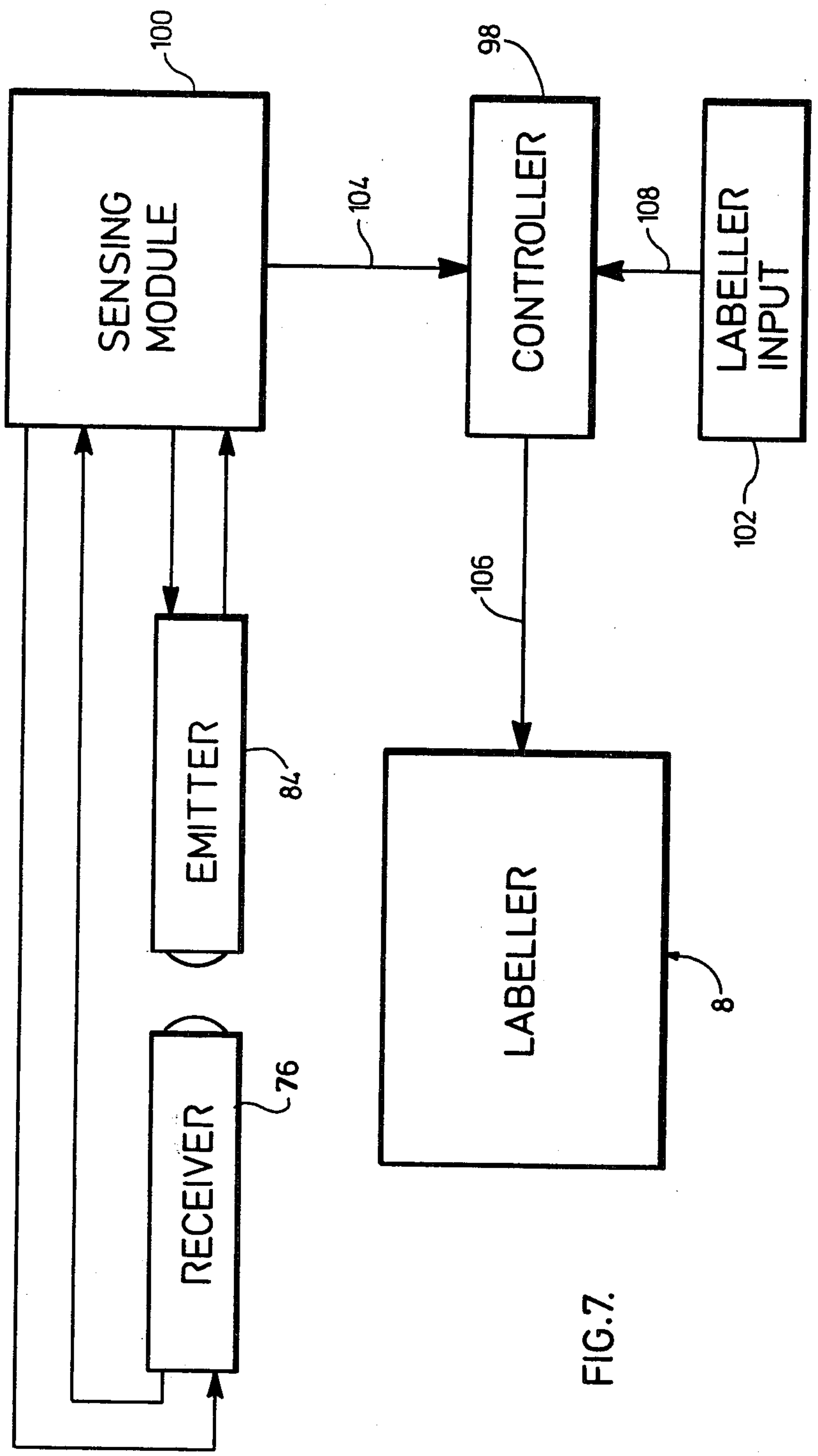
FIG. 7 is a block diagram representative of the components and control for such components in labelling apparatus.

Turning to FIG. 7, an aspect of the control for the system is shown where the labeller 8 is controlled by controller 98. The controller 98 receives input from the sensing module 100 and from data input 102 by lines 104 and 108. The emitter 84 and receiver 76 are shown with inputs and outputs to sensing module 100. The preferred type of light emitter/receiver and sensing module may be the type sold by Banner Engineering Corporation which uses infrared pulse modulated beam of light at approximately 20 KHz. The receiver in the sensing module, as controlled thereby, is tuned to sense only infrared light so that ambient light has little or no influence on the operation of the sensor. The signal the module 82 generates on sensing a label may be in the form of a voltage spike which provides input to the controller via electrical hookup 104.

The operation of the label sensor 50 is such that the light emitter 84 directs a beam of light onto the supply of labels where the lense 86 focuses such beam of light. When no label is present on the web, a level of light, as received by receiver 76, provides a degree of input to sensing module 100. This degree of input may be in terms of a voltage level. Depending upon the arrangement, the sensing module 100 may, on detecting solely the web, provide an output in line 104 to signal controller that no label is present. A second signal from sensing module 100 is generated when the level of light received by receiver 76 is decreased and may be zero. This decrease is, of course, caused by at least a leading portion of the label next to be applied interrupting the transmission of light between emitter and receiver. On detecting the leading portion of the label, a characteristic signal is generated which is passed onto the controller. The controller 100 is connected to the labeller 8 via line 106. The controller determines the starting, stopping and rate of movement of the web where the controller sends signals via line 106 to the labeller 8 and in particular the drive motor 60 of the labeller to speed up, slow down, or stop, or maintain a constant speed for the motor.

Various types of drive units may be used for the labeller 8, such as the motor arrangement which is made up of a constant rotating drive which engages a driveshaft for roller 46 by way of a particle clutch and which brakes the driveshaft by way of a particular brake. Such control is effected by inducing electromagnetic fields in the clutch and brake. This results in a substantially instant speed-up to labelling speed and a substantially instantaneous stop in label feed. Such a drive system for a labeller is disclosed in United States patent application Ser. No. 830,118. Another form of drive mechanism may be that of a servo-motor whose speed can be electronically controlled. Such use of servo-motor drives is described in co-pending patent application Ser. No. 112,431. The controller 98, in each instance, determines the starting-stopping of the drive mechanism 46 for the web, its constant speed and acceleration and decelaration. The controller 98, therefore, serves to coordinate, equate the speed of, or synchronize the movement of the label with the detected rate of movement of conveyed article for label application.

Figure 4:
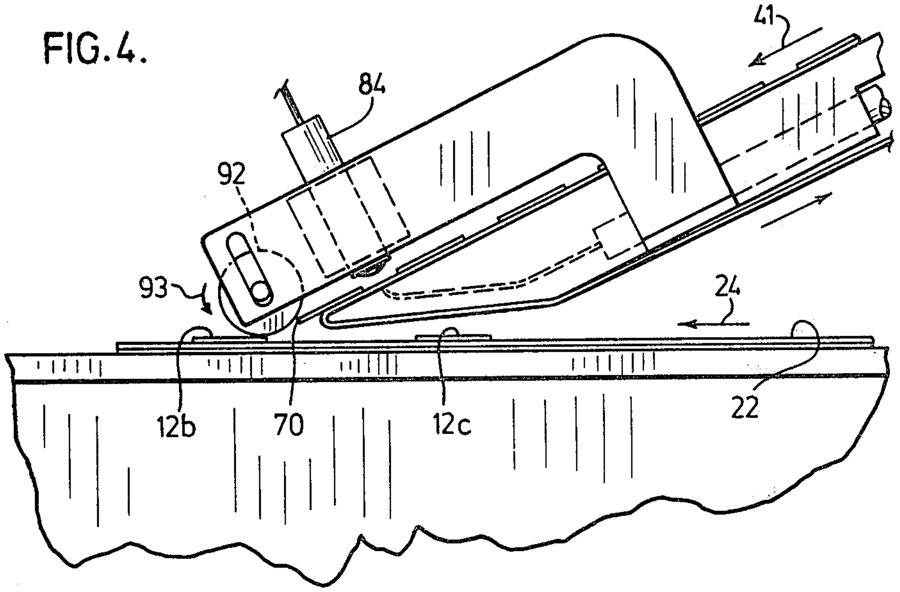
FIGS. 4, 5 and 6 show in sequence the application of label to conveyed article.
Figure 5:
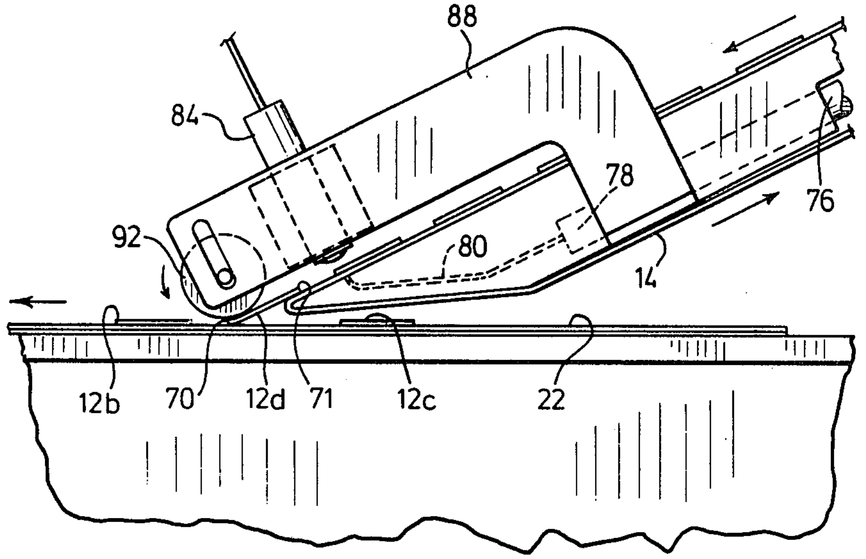
Figure 6:
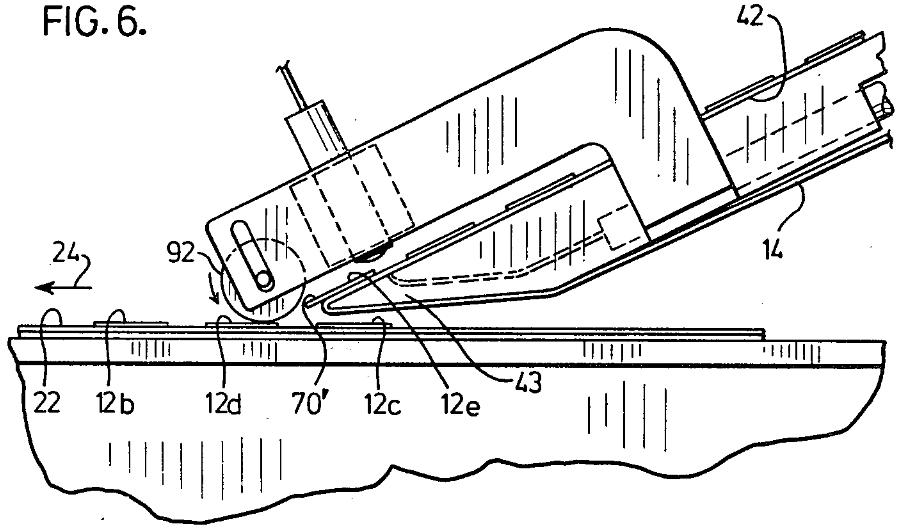

Reference is now made to FIGS. 4, 5 and 6 of the drawings to discuss the sequence in applying a label to the folder. Referring to FIG. 4, a signal has been received by the controller from the labeller input to apply a label to the conveyed folder 22 which is moving in the direction of arrow 24. Assuming for the moment that the conveyed article is moving at a constant velocity, the label, as shown in the position FIG. 3, which is at that particular point stationary, must be accelerated to a speed which corresponds with the linear velocity of the conveyed folder 22. Therefore, the controller, on receiving a signal to label from input 102, activates the labeller via line 106 to commence powering the drive mechanism 60 to accelerate the web in the direction of arrow 41. As this is happening, the label is further separated from the web. The timing of the labeller start-up is such that the leading portion 70 of the label contacts the file folder 22 at the precise point to which the label is to be applied. The roller applicator 92, due to its spring loaded engagement with the file folder, rolls in the direction of arrow 93. The arrangement is such that, as the label is about to contact the file folder 22, the roller contacts the leading portion 70 of label 12*d* to press it onto the file folder and provide adherence between label and folder. As shown in FIG. 5, the leading portion of the label is in contact with folder while the trailing portion is still in contact with the web. Due to the corresponding speeds between folder and label, the label is smoothly applied to the folder surface as they are both travelling in the same direction and speed to relieve the label from the web. Assuming there is no subsequent signal to label, the controller is programmed to continue movement of the web after the leading portion of the next label 12*e* has been sensed and while the label 12*d*, in this instance, is still being applied by the application roller 92. The controller, after having received a signal from the sensing module, continues to run the labeller 8 until a predetermined extension of the label 70' extends beyond the wedge-shaped portion 43 of the ramp 42. In this particular embodiment, the extent of run-on is shown in FIG. 6 where the leading edge 70' of label 12*e* has been separated from the carrier web 14 and is now stationary. The folder 22 is conveyed away from the labeller in the direction of arrow 44 with the label 12*e* in the proper position between labels 12*d* and 12*c*.

Due to the fixed relationship of the label sensor to the label applicator, the desired extent of label overhang is determined by the controller to accomplish various labelling operations. The extent to which the peeled off portion of a label extends beyond the ramp, when the labeller has come to rest, is determined, for example, by the rate of article movements, rate at which the web can be accelerated from a standing position, the surface configuration of the article, the particular device used to contact label with article, the sizes in terms of width and length of the labels to be applied, and other reasons which would become apparent to those skilled in the art in considering this type of labelling operation.

With this arrangement, there is no need to alter the location of the label sensing device in sensing the leading edge of the label to determine the extent of label overhang, because the controller 98, in governing web movement, provides any desired extent of label overhang to accomplish the particular labelling function. This arrangement in providing label overhang ensures that the applied label is completely stripped from the web before stoppage of the web.

The precision of label application is afforded by positioning the label relative to the conveyed article when it is stopped such that on start-up, the label can be brought into contact with a particular part of the article in a precise controlled manner. As shown in FIG. 5, the trailing portion 71 of the label being applied remains in contact with the web during the initial stages of application to ensure control over label position until it has been firmly affixed to the conveyed article by application device 92. Providing this aspect of label control, while being initially applied, enhances the precision achieved in labelling an article.

The controller 98 resumes or returns the web movement to the speed at which the next label may be applied as determined by input from labeller input 102. In instances where two or more of the same labels are to be applied to the same article, it may be necessary to continue to run the labeller at its labelling speed to apply labels to the article in a manner such that the labels are spaced-apart on the article to the same extent as the label in this example is spaced-apart on the web. In such instances, the controller 98 does not stop the labelling operation so that the drive mechanism would in essence continue to operate at the same speed until a signal from the controller 98 decelerates the drive mechanism or causes it to stop instantaneously where the extent of label overhang would be that desired, such as shown in FIG. 6.

In accomplishing the delay in stopping the movement of the label or in determining the extent of label overhang, one approach is to use a programmable controller such as an electronic computer, which decelerates the labeller such that when it stops, the desired extent of overhang is achieved. Due to the fact that the controller is programmable, it is understood that varying extents of label extension may be achieved to accommodate different labelling applications with the same labelling device without the need to adjust the label sensor position. As a result, the labeller 8 may be manufactured as a stock item and then by varying the operation of the controller, the extent of label overhang may be tailor made for application of particular labels to a particular type of article. This arrangement, therefore, provides a package unit which may be manufactured in an economic manner.

Another approach in accomplishing delay in determing the extent of label overhang is to provide in controller 98 a first aspect of control which delays transmission of signal from the label sensor on detecting or sensing the leading portion of a label to a second aspect of the controller which controls the drive mechanism of the labeller. In this somewhat simpler arrangement, as compared to an electronic computer, the controller in including a delay device for the signal may be arranged or made in a manner such that the delay in signal transmission is variable for selectable desired periods of time. The controller may be set up such that, on receiving the delayed signal, it immediately stops the label drive to thereby stop web movement. The selected predetermined period can, therefore, be such that, when the signal is transmitted, the web movement is stopped so as to locate the leading edge of the separated label portion at the desired position in readiness for subsequent labellng of an article. This delay in transmission of signal from sensor to aspect of controller which operates the labeller drive can be accomplished by various devices, such as a time delay relay or digital counter which transmits the signal after a desired number of pulse counts.

This system for applying labels may be adapted to apply different lengths of labels to the same conveyed article due to the sensing and controlling arrangement. For example, consider the application of labels to front and back of a conveyed article, the label applied to the back being of different length than the front label. The supply of labels would, therefore, provide the differing labels alternately spaced along the carrier web. Therefore, in any one pass of article by labeller, the label may be contacted to the front of the article and then a different size label contacted to the back of the article to accomplish this unique form of labelling with a single labeller.

A preferred aspect of the labeller has been discussed with respect to labels 12 spaced-apart on the carrier web 14. It is, of course, appreciated that the invention applies equally well to the application of labels which are minimally, if at all, spaced-apart on the carrier web. For example, the supply of labels may be in the form of "butt cut" labels on the carrier web. For this arrangement, the trailing edge of one label abuts the leading edge of the next label. Such a supply of labels can be formed by simply providing a cut or severance through the material carried on the web by a knife edge or the like. Preferably label detection devices, other than the optic sensor shown in FIG. 1, may be used to detect the leading edge of the label next to be applied. This may be accomplished, for example, by providing a detector which causes in the web a point of flexing so that a break is formed between two adjacent labels. Means may, therefore, be provided to detect the elevated or raised portion of the leading edge of the label. This may be in the form of a detector mounted in the same area as that of detector or light sensor 50, as shown in FIG. 1, which incorporates a profile following sensor to detect this break in the label series. The detector could be in the form of a needle of a photograph cartridge which generates a signal on detecting this break in the label series to thereby indicate that the leading edge of the label next to be applied has been detected.

With this type of detection system used in association with butt-cut labels, the invention is capable of applying the individual labels to conveyed articles in the manner discussed with respect to the spaced-apart labels on a carrier web. This is due to the fact that subsequent to detecting leading edge of label, a controller serves to position separated portion of label leading edge beyond the web in readiness for application to the next conveyed article. This ensures that the preceeding label has been smoothly applied to a preceeding conveyed article. In using a supply of butt-cut labels, it is, therefore, possible with this invention to apply to an article labels which are spaced-apart on the article anywhere from application of a series which have insignificant spacing between them to a series which has any desired degree of spacing between the labels. It can be appreciated that the spacing between the labels is determined by the controller in varying the speed at which the web is handled where the spacing between labels would be determined by decelerating and then accelerating for a determined period of time the web movement before application of the next label to provide a desired space in applying label to the conveyed article.

Although preferred embodiments of the invention have been described herein in detail, it will be understood by those skilled in the art that variations may be made thereto without departing from the spirit of the invention or the scope of the appended claims.

The embodiments of the invention in which an exclusive property of privilege is claimed are defined as follows:

1. In labelling apparatus for applying labels to a continuously conveyed article, a labeller adapted to use a supply of labels carried on a web, each such label having a pressure-sensitive adhesive on its back which is releasably affixed to such web, said labeller comprising a label separation means for commencing a separation of a label leading edge from such web, said label separation means being located proximate such article to be labelled when conveyed thereby, label application means for contacting such pressure-sensitive adhesive side of separated label leading edge with such conveyed article, web handling means for feeding such supply of labels to and for taking such web away from said label separation means, label sensor means adapted to sense said leading edge of such label next to be separated from such web, control means for controlling web movement, said control means on receiving a signal from said label sensor that said leading edge of label has been sensed, controls said web handling means in separating at least such sensed leading label edge from such web and continue movement of said leading edge of separated label portion to a position preparatory to article application, said control means timing the resumption of web movement to synchronize label speed with the detected article speed for contacting the label at the desired location on such conveyed article.

2. In labelling apparatus of claim 1, support means on said labeller is provided for holding a rolled supply of labels for said web handling means.

3. In labelling apparatus of claim 1, said label separation means including a wedge-shaped portion about which such web is trained by said web handling means, the sudden change in direcion of web travel effecting a separation of label leading portion from web.

4. In labelling apparatus of claim 3, said wedge-shaped portion being spaced a predetermined distance from surface of article to receive label when conveyed thereby.

5. In labelling apparatus of claim 3, said web handling means comprising a ramp extending rearwardly of said wedge-shaped portion, such web as trained over said wedge-shaped portion being pulled rearwardly under said ramp by counter-rotating drive rollers, said control means controlling the drive of said rollers.

6. In labelling apparatus of claim 3 adapted to apply labels which are spaced apart on said web, said label sensor means comprising a light emitter spaced-apart from and directed on a light receiver, one of said emitters and receivers being positioned in said wedge-shaped portion and the other positioned above said wedge-shaped portion, the arrangement being such to sense the position of a leading portion of a label which is about to be separated from such web.

7. In labelling apparatus of claim 1, said label detector being adapted to sense leading edge of a label about to be applied which abuts trailing edge of a preceeding label on such web which is being applied.

8. In labelling apparatus of claim 3, said control means providing a delay in stopping web movement to present a predetermined extent of peeled label overhang beyond said wedge-shaped portion.

9. In labelling apparatus of claim 1, said label application means contacting such leading label edge with article while trailing portion of label is in contact with web, such web movement synchronizing label and article speeds.

10. In labelling apparatus of claim 1, said control means being a programmable computer, the delay in web movement stoppage being determined by such computer program, said computer coordinating web movement with conveyed article such that web delivers peeled label at linear velocity corresponding to conveyed linear velocity of article on resuming web movement.

11. In labelling apparatus of claim 10, the distance between peeled label leading edge and conveyed article being such that on resuming web movement to application speed, such distance is sufficient to enable acceleration of label to application speed for precision labelling.

12. In labelling apparatus of claim 1, said control means including delay means which delays transmission of signal from said label sensor a predetermined period of time and drive control means for controlling web movement by said web handling means, said drive control means stopping web movement upon receipt of delay signal from said delay means, such predetermined period of time being sufficient that web movement positioned such sensed label leading edge preparatory to article application.

* * * * *